Aug. 26, 1969  R. W. RUE  3,463,187
HYDRAULICALLY OPERATED POWER STEERING CIRCUIT
Filed Feb. 7, 1968

INVENTOR
ROBERT W. RUE

BY Dodge and Sons

ATTORNEYS

United States Patent Office 3,463,187
Patented Aug. 26, 1969

3,463,187
**HYDRAULICALLY OPERATED POWER
STEERING CIRCUIT**
Robert W. Rue, Kalamazoo, Mich., assignor to General
Signal Corporation, a corporation of New York
Filed Feb. 7, 1968, Ser. No. 703,720
Int. Cl. F16k *11/00;* F15b *11/08, 13/04*
U.S. Cl. 137—596                                    4 Claims

ABSTRACT OF THE DISCLOSURE

Hydraulically operated power steering circuits employing a metering valve for controlling the flows to and from the steering cylinder, and a separate lock-out valve operated by the differential between the inlet and exhaust pressures of the metering valve for isolating the cylinder from the metering valve when the latter is in neutral position. Return flow from each side of the cylinder is restricted by a check valve located either between the cylinder and the lock-out valve or between the latter and the metering valve. Check valve-controlled paths by-passing the flow-restricting check valves insure substantially unrestricted flow to the two sides of the cylinder.

Background and summary of the invention

Application Ser. No. 590,050, filed Oct. 27, 1966, now Patent 3,410,306, discloses a hydraulically operated power steering circuit including a valve for metering oil to and from the steering cylinder, and a separate lock-out valve which serves to isolate the cylinder from the metering valve when the latter is in neutral position and the vehicle is moving straight ahead. In contrast to an earlier lock-out valve, which had open positions at opposite sides of a central, closed position and was undamped, the corresponding valve in said application moves unidirectionally from its closed position, and its closing movement is damped. Although these differences tend to eliminate the shocks which can be produced by the prior design, experience with the circuit of application Ser. No. 590,050 shows that shocks still occur under certain conditions when the circuit is used on a large articulated vehicle, such as a loader, fitted with axles of the torque-proportioning type. The shocks just mentioned are encountered under various conditions, but may be easily observed when the vehicle is at rest on a concrete pavement, and it is turned first to the limiting position in one direction and then to the limiting position in the opposite direction. What happens is that certain parts of the vehicle, such as the tires and the axles, are twisted or torsionally stressed during the first maneuver so that large restoring forces are developed in them. When the steering wheel is subsequently turned in the opposite direction, these restoring or "wind-up" forces, as they are called, cause the vehicle to lead the operator's command, i.e., to turn at a rate greater than that called for by hydraulic steering circuit. This has the effect of reducing drastically the inlet pressure in the metering valve. Since the lock-out valve responds to the difference between inlet and exhaust pressures, this valve closes and hydraulically locks the steering cylinder while the vehicle is still turning. This can result in a severe shock.

Although the condition just described can be eliminated, or at least improved, by increasing the degree to which the lock-out valve is dampened, this is not a satisfactory solution because it retards closing movement of the lock-out valve under all conditions. The lock-out valve is included in the circuit to insure that the two halves of the loader will not collapse or pivot relatively to each other as the loader is driven into a pile of the material being moved. Since this bucket-filling operation frequently is preceded by at least one turn, there must be a pause between the last turn and the filling operation if the lock-out valve is damped sufficiently to eliminate the shock problem. Otherwise, the lock-out valve would not have time to close and prevent collapse of the vehicle. These pauses unduly prolong the work cycle of the loader.

The object of this invention is to provide an improvement in the power steering circuit mentioned above which eliminates the shock problem without unduly lengthening the work cycle of the machine or increasing the risk of vehicle collapse. According to the invention, the steering circuit is equipped with flow restricting means which impedes and returns flow from either side of the steering cylinder or cylinders through the lock-out and metering valves. Preferably the flow restricting means comprises a pair of check valves located either in the flow paths connecting the cylinder with the lock-out valve or in the two paths connecting the lock-out valve with the metering valve. The invention also provides means for insuring substantially free flow from the metering valve to each side of the cylinder. This means preferably takes the form of a pair of by-pass paths which lead around the flow-restricting check valves and which contain separate check valves oriented to permit flow toward, but not away from, the cylinder. The flow-restricting check valves create a backpressure in the contracting side of the steering cylinder regardless of the direction of the turn, and they are so set that this pressure will counterbalance the "wind-up" forces and keep the vehicle from leading the operator's command. This arrangement insures that inlet pressure will change only in accordance with the operator's command, and thus prevents premature closure of the lock-out valve. In this way, the invention counteracts the undesirable effect of vehicle "wind-up" while at the same time making it unnecessary to damp the lock-out valve to an intolerably high degree.

Description of the preferred embodiments

Several embodiments of the invention are described herein with reference to the accompanying drawing in which.

Figure 1:
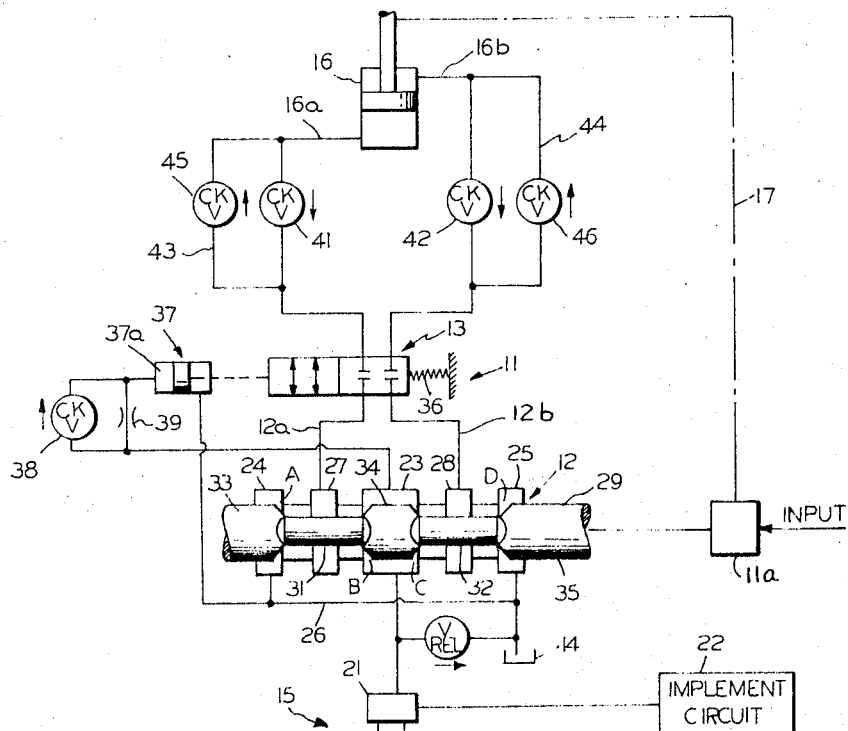
FIG. 1 is a schematic diagram of a hydraulic system incorporating the improved circuit.

As shown in FIG. 1, the improved steering circuit 11 includes metering and lock-out valves 12 and 13, respectively, and is embodied in a system comprising a steering linkage 11a through which the operator actuates the metering valve, an oil reservoir or tank 14, a source 15 of hydraulic fluid under pressure, one or more steering cylinders represented by the single cylinder 16, and a negative feedback connection 17 between cylinder 16 and the steering linkage 11a. Source 15, which preferably supplies valve 12 with fluid at a constant rate throughout a selected range of engine speeds, comprises a pair of fixed displacement pumps 18 and 19 which are driven by the vehicle's propulsion engine (not shown), and a regulating valve 21 of the type disclosed in application Ser. No. 528,700, filed Feb. 21, 1966 and now Patent 3,410,295. The regulating valve delivers to metering valve 12 the total output of pump 18 and a portion of the output of pump 19 which varies inversely with engine speed. The excess fluid supplied by pump 19 is diverted to the vehicle's implement circuit 22.

Metering valve 12 includes an inlet chamber 23 which is connected with source 15, a pair of exhaust chambers 24 and 25 which are connected with tank 14 via a manifold 26, a pair of delivery chambers 27 and 28 connected, respectively, with delivery passages 12a and 12b, and a sliding valve spool 29. The valve spool is connected with steering linkage 11a and is formed with a pair of annular, peripheral grooves 31 and 32 which define three valve lands 33–35. The right edge of land 33 is provided with four circumferentially spaced, inclined metering flats which, with the wall of the bore in which spool 29 is received, define a control orifice A. Lands 34 and 35 are provided with similar flats that define three additional control orifices B, C and D. When valve spool 29 is in the illustrated neutral position, all of the orifices are open, but, when the spool is shifted in opposite directions from this position, either orifices A and C or orifices B and D are closed. These control orifices are so shaped that the differential between the pressures in delivery chambers 27 and 28 varies linearly with movement of spool 29.

Lock-out valve 13 is a two-position valve which controls communications between the delivery passages 12a and 12b of valve 12 and the motor passages 16a and 16b, respectively, leading to the opposite sides of cylinder 16. Valve 13 is biased closed by spring 36 and is shifted in the opening direction by a double-acting pressure motor 37 which responds to the difference between the pressures in inlet chamber 23 and exhaust manifold 26. Working space 37a of motor 37 is connected with inlet chamber 23 through a one-way flow restrictor comprising a check valve 38 and a restricted by-pass passage 39. This restriction device retards closing movement of valve 13 and thereby causes this movement to lag slightly the movement of valve spool 29 to its neutral position. As explained in application Ser. No. 590,050, the lag eliminates shocks during rapid changes in the steering direction, and also allows the vehicle to damp naturally whenever a steering correction is made.

The parts of the system described thus far are identical to those shown in application Ser. No. 590,050. The improvement provided by the present invention consists of a pair of check valves 41 and 42 interposed between motor passages 16a and 16b, respectively, and valve 13 and oriented to block flow toward cylinder 16, and a pair of by-pass paths 43 and 44 which lead around the check valves 41 and 42, respectively, and contain chack valves 45 and 46 which are oriented to block flow away from cylinder 16. Check valves 41 and 42 serve as restrictors for the return flows from cylinder 16 and are set to open at a pressure differential on the order of 100 to 200 p.s.i. Check valves 45 and 46, on the other hand, serve merely as switches and are set to open at a low pressure drop of about 5 p.s.i.

When the FIG. 1 circuit is in use and the leading and trailing portions of the articulated vehicle are aligned, i.e., set for straight ahead movement, valve spool 29 will assume the illustrated neutral position, and the oil delivered by source 15 will pass to tank 14 along two parallel paths; one path comprising chamber 23, orifice B, spool groove 31, orifice A, chamber 24 and manifold 26, and the other path comprising chamber 23, orifice C, spool groove 32, orifice D, chamber 25 and manifold 26. These two paths are essentially unrestricted so the differential between the pressures in inlet chamber 23 and exhaust manifold 26 will be small. Therefore, spring 36 will hold lock-out valve 13 in the illustrated closed position against the opposition of the small shifting force developed by motor 37, and cylinder 16 will be hydraulically locked.

When the operator desires to turn the vehicle to the right, he shifts valve spool 29 to the right to reduce the flow areas of orifices A and C and thereby raise the pressure in chambers 23 and 27 relative to the pressure in exhaust manifold 26. This pressure change is immediately reflected at motor 37, since check valve 38 permits essentially free flow from inlet chamber 23 to working space 37a; therefore, motor 37 shifts lock-out valve 13 to its open position. As a result, the oil supplied to delivery chamber 27 through orifice B will now flow to the head end of cylinder 16 through passage 12a, lock-out valve 13, by-pass path 43 and passage 16a, and the cylinder will swing the leading end of the loader to the right relative to the trailing end. During movement of the cylinder, the oil displaced from the rod end returns to tank 14 via passage 16b, check valve 42, lock-out valve 13, passage 12b, delivery chamber 28, orifice D, chamber 25 and exhaust manifold 26.

As the vehicle commences to turn, feedback connection 17 begins to move spool 29 back toward the neutral position. In the usual case the vehicle overshoots, i.e., moves beyond the desired position, and therefore the feedback connection actually shifts spool 29 to a position at the left side of neutral. This reduces the flow areas of orifices B and D and raises the pressure in delivery chamber 28 relative to the pressure in exhaust manifold 26. Oil under pressure is now delivered to the rod end of cylinder 16 via passage 12b, lock-out valve 13, by-pass path 44 and passage 16b, and the cylinder pivots the two halves of the vehicle back toward the selected position. During this mode of operation, the oil displaced from the head end of cylinder 16 returns to tank 14 via passage 16a, check valve 41, lock-out valve 13, passage 12a, delivery chamber 27, orifice A, chamber 24 and exhaust manifold 26. The steering circuit might again cause the vehicle to move through the desired position and, in that event, feedback connection 17 will shift valve spool 29 to the right side of neutral and cause it again to pressurize and vent the head and rod ends, respectively, of cylinder 16. This causes the cylinder to again turn the vehicle to the right. These actuating cycles will continue until oscillation of the two halves of the vehicle has been completely damped. Although, during this oscillation period, the differential between the pressures in inlet chamber 23 and exhaust manifold 26 decreases to a low value each time valve spool 29 moves through its neutral position, it does not remain at this low level long enough to permit any appreciable portion of the oil in working space 37a to escape through the restricted passage 39. Therefore, lock-out valve 13 remains in the open position throughout this period and permits the vehicle to damp naturally in the manner described above.

If the load acting on cylinder 16 is small, the vehicle will oscillate about a position corresponding to the position of the steering wheel, and the circuit will come to rest with the vehicle in that position and the valve spool 29 in the illustrated neutral position. In this case, the differential between the pressures in chamber 23 and exhaust manifold 26 will remain at a low level, and spring 36 will return lock-out valve 13 to its closed position. On the other hand, if cylinder 16 is under a substantial load, as a result, for example of "wind-up" forces, the vehicle will oscillate about, and come to rest in, a position closer to the centered or aligned position than the one corresponding to the position of the steering wheel. Under this condition, valve spool 29 stops in a position at the right side of neutral position in which the backpressure developed in delivery chamber 27 by orifice A is just sufficient to enable cylinder 16 to balance the load. Since the pressure in inlet chamber 23 now is substantially higher than the pressure in exhaust manifold 26, motor 37 will hold lock-out valve 13 open. Although, in this case, cylinder 16 is not hydraulically locked, and external loads can cause transient changes in the steering angle of the vehicle, this is no real problem because the bucket normally is not loaded, and large eccentric loads are not encountered, when the vehicle is turned.

In order to return the two halves of the vehicle to the aligned position, or to execute a left turn, the operator rotates the steering wheel in the opposite direction to thereby shift valve spool 29 to the left side of neutral position. This action reduces the flow areas of orifices B and D and raises the pressure in delivery chamber 28 relative to the pressure in exhaust manifold 26. If lock-out valve 13 is not already open, it now opens to deliver oil under pressure to the rod end of cylinder 16 and to connect the head end of the cylinder to tank 14 through check valve 41 and control orifice A. The cylinder now turns the vehicle to the left and, after an oscillation period similar to the one described above, the system will come to rest. If the two halves of the vehicle are realigned, spool 29 will come to rest in the neutral position, and shortly thereafter lock-out valve 13 will close to hydraulically lock cylinder 16.

If the axles and tires are under "wind-up" stresses at the commencement of the preceding steering maneuver, the two halves of the vehicle will tend to turn left at a rate exceeding that which the steering circuit 11 can produce. If this tendency were not checked, the rod end of cylinder 16 would demand oil at a rate greater than that at which it is being supplied, and the pressure in delivery chamber 28 and inlet chamber 23 would decrease relative to the pressure in exhaust manifold 26. As a result, spring 36 would close lock-out valve 13 and hydraulically lock cylinder 16 while the two halves of the vehicle were moving relatively to each other. This, of course, could produce a severe shock. In the illustrated embodiment, this condition is eliminated by check valve 41 which restricts the return flow from the head end of cylinder 16 sufficiently to prevent the cylinder from moving at a rate faster than that called for by the steering circuit. With this arrangement, the pressure in chamber 23 always remains high enough to enable motor 37 to hold lock-out valve 13 open. Of course, if the valve spool 29 is returned to the neutral position, inlet pressure will decrease as soon as the steered parts come to rest, and then valve 13 will close as in the normal case.

In cases where the vehicle is turned first to the left and then to the right, check valve 42 is effective to restrict return flow from cylinder 16 and prevent the vehicle from leading the steering command when the turning direction is changed.

Figure 3:
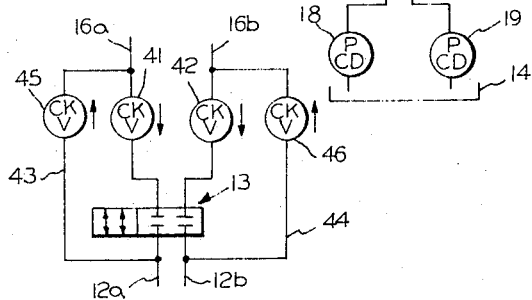
FIGS. 2–4 are schematic diagrams of the improved circuit showing alternative locations for the flow-restricting check valves and the by-pass paths.
Figure 2:
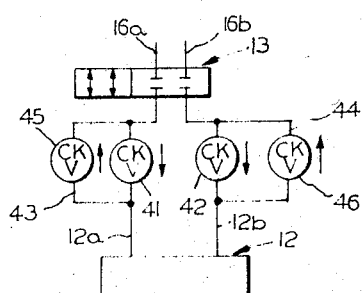
Figure 4:
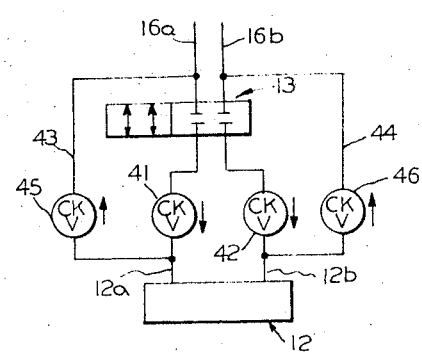

Although FIG. 1 shows the flow-restricting check valves 41 and 42 and the associated by-pass paths 43 and 44 interposed in the connections between lock-out valve 13 and cylinder 16, it will be evident to those skilled in the art that these parts can also perform their intended functions when they are located in the passages 12a and 12b which interconnect the lock-out and metering valves 13 and 12. This alternative is illustrated in FIG. 2. Furthermore, since return flow from the cylinder 16 through the by-pass paths is inherently prevented by check valves 45 and 46, it will be obvious that the paths 43 and 44 may by-pass the lock-out valve 13 as well as the associated flow-restricting check valves 41 and 42. FIGS. 3 and 4 illustrate this alternative for the arrangements of the flow-restricting check valves shown in FIGS. 1 and 2, respectively.

Another possible alternative to the illustrated arrangements of parts 41–46 consists of a single flow restrictor interposed in the connection between exhaust manifold 26 and tank 14. While such a restrictor would retard movement of cylinder 16 and insure that the vehicle would follow, and not lead, the steering command, it has the disadvantage of restricting the open center flow through metering valve 12 when spool 29 is in the neutral position. The pressure losses attributable to this restriction of the open center flow normally would be considered intolerable.

Finally, it should be noted that since the check valves 41 and 42 are employed solely as flow restrictors, theoretically they could be replaced by fixed metering orifices. However, this alternative is not considered satisfactory from the practical standpoint because the maximum rate of flow in steering circuit 11 is not truly constant. The reason for this is that the output of the pumps 18 and 19 varies with the speed of the vehicle's engine, and the regulating valve 21 maintains a constant flow rate to the steering circuit only over a preselected range of engine speeds. The fixed orifice flow restrictor can be set to establish the required backpressure at only one flow rate, and therefore under some conditions movement of cylinder 16 will be retarded either too much or too little. In contrast, the check valve type of flow restrictor can be designed to afford a substantially uniform backpressure throughout a wide range of flow rates, and therefore it can compensate for changes in the maximum steering flow rate.

I claim:
1. In a hydraulic circuit including a metering valve (12) shiftable in opposite directions from a neutral position, in which it connects each of two delivery passages (12a, 12b) with inlet (23) and exhaust (26) passages, to restrict communication between one or the other delivery passage and the inlet passage while simultaneously restricting communication between the remaining delivery passage and the exhaust passage; and a lock-out valve (13) responsive to the pressures in the inlet and exhaust passages for opening and closing a flow path between the first delivery passage and a first motor passage (16a) and a second flow path between the second delivery passage and a second motor passage (16b), the improvement which comprises means (41–46) for restricting return flow from the first and second motor passages to the exhaust passage through the lock-out and metering valves while permitting substantially free flows from the first and second delivery passages to the first and second motor passages, respectively.

2. The improved hydraulic circuit defined in claim 1 in which said means comprises
  (a) a first flow restrictor (41) interposed in a flow path between the first delivery (12a) and motor (16a) passages which is controlled by the lock-out valve (13);
  (b) a second flow restrictor (42) interposed in a flow path between the second delivery (12b) and motor (16b) passages which is controlled by the lock-out valve (13);
  (c) a first by-pass path (43) connected with the first delivery and motor passages for by-passing fluid around the first flow restrictor (41);
  (d) a second by-pass path (44) connected with the second delivery and motor passages for by-passing fluid around the second flow restrictor (42); and
  (e) a check valve (45, 46) in each by-pass path oriented to block flow toward the associated delivery passage.

3. The improved hydraulic circuit defined in claim 2 in which each flow resistor (41, 42) is a check valve oriented to block flow from the associated delivery passage (12a or 12b) to the associated motor passage (16a or 16b), the restrictor check valves being set to open at higher pressure differentials than the by-pass check valves (45, 46).

4. The improved hydraulic circuit defined in claim 3 in which each restrictor check valve (41, 42) is located at the motor passage side of the lock-out valve (13), whereby the outlets of these valves are disconnected from the associated delivery passages (12a, 12b) when the lock-out valve is closed.

References Cited

UNITED STATES PATENTS 3,267,961   8/1966   Rice _____ 137—596
3,410,306   11/1968   Malott _____ 137—596.2

HENRY T. KLINKSIEK, Primary Examiner

U.S. Cl. X.R.

91—451; 137—596.2

PO-1050
(5/69)

UNITED STATES PATENT OFFICE
CERTIFICATE OF CORRECTION

Patent No. 3,463,187          Dated August 26, 1969

Inventor(s) Robert W. Rue

It is certified that error appears in the above-identified patent and that said Letters Patent are hereby corrected as shown below:

Column 6, line 27, "flow" should read -- flows --;

line 52, "resistor" should read -- restrictor --.

SIGNED AND
SEALED
APR 28 1970

(SEAL)
Attest:

Edward M. Fletcher, Jr.
Attesting Officer

WILLIAM E. SCHUYLER, JR.
Commissioner of Patents